United States Patent [19]
Gornowicz et al.

[11] Patent Number: 6,013,715
[45] Date of Patent: Jan. 11, 2000

[54] THERMOPLASTIC SILICONE ELASTOMERS

[75] Inventors: Gerald Alphonse Gornowicz; Kevin Edward Lupton; David Joseph Romenesko; Kim Struble; Hongxi Zhang, all of Midland, Mich.

[73] Assignee: Dow Corning Corporation, Midland, Mich.

[21] Appl. No.: 09/034,089

[22] Filed: Mar. 3, 1998

Related U.S. Application Data

[63] Continuation-in-part of application No. 08/837,835, Apr. 22, 1997, abandoned.

[51] Int. Cl.$^7$ .................................................. C08K 3/00
[52] U.S. Cl. ......................... 524/492; 524/493; 524/588
[58] Field of Search ................................... 524/492, 493, 524/588

[56] References Cited

U.S. PATENT DOCUMENTS

| | | | |
|---|---|---|---|
| Re. 33,070 | 9/1989 | Arkles | 525/431 |
| 3,627,836 | 12/1971 | Getson | 260/825 |
| 3,865,897 | 2/1975 | Falender | 260/827 |
| 3,969,308 | 7/1976 | Penneck | 260/37 SB |
| 4,500,688 | 2/1985 | Arkles | 525/431 |
| 4,695,602 | 9/1987 | Crosby | 524/439 |
| 4,714,739 | 12/1987 | Arkles | 525/92 |
| 4,775,712 | 10/1988 | Sasaki | 524/504 |
| 4,803,244 | 2/1989 | Umpleby | 525/105 |
| 4,831,071 | 5/1989 | Ward | 524/401 |
| 4,848,469 | 7/1989 | Crosby | 524/439 |
| 4,888,390 | 12/1989 | Liang | 525/189 |
| 4,970,263 | 11/1990 | Arkles | 525/92 |
| 5,051,478 | 9/1991 | Puydak | 525/195 |
| 5,391,594 | 2/1995 | Romenesko | 523/212 |
| 5,556,908 | 9/1996 | Chung | 524/493 |
| 5,604,288 | 2/1997 | Furukawa | 24/493 |
| 5,648,426 | 7/1997 | Zolotnitsky | 525/100 |

FOREIGN PATENT DOCUMENTS

| | | |
|---|---|---|
| 279414 | 8/1988 | European Pat. Off. ........ C08L 83/07 |
| 410888 | 7/1990 | European Pat. Off. . |
| 506465 | 9/1992 | European Pat. Off. . |
| 651009 | 10/1994 | European Pat. Off. . |
| 651099 | 5/1995 | European Pat. Off. . |
| 62-11897 | 1/1987 | Japan . |
| 62-121752 | 6/1987 | Japan . |
| 63-219147 | 9/1988 | Japan . |
| 3-115450 | 5/1991 | Japan . |
| 5-59287 | 3/1993 | Japan . |
| 7-26147 | 1/1995 | Japan . |
| 08337698 | 12/1996 | Japan . |
| WO 96/01291 | 6/1995 | WIPO . |

*Primary Examiner*—Edward J. Cain
*Attorney, Agent, or Firm*—Alex Weitz

[57] ABSTRACT

There is disclosed a method for preparing a thermoplastic elastomer, said method comprising:
(I) mixing
(A) a thermoplastic resin selected from the group consisting of a polyolefin and a poly(butylene terephthalate),
(B) a diorganopolysiloxane having a plasticity of at least 30 and having an average of at least 2 alkenyl radicals in its molecule,
(C) an organohydrido silicon compound which contains an average of at least 2 silicon-bonded hydrogen groups in its molecule,
(D) optionally, a reinforcing filler and
(E) a hydrozilation catalyst; and
(II) dynamically curing said diorganopolysiloxane (B), wherein the amount of said diorganopolysiloxane (B) used is such that at least one property of the thermoplastic elastomer selected from tensile strength or elongation is at least 25% greater than the respective property for a corresponding simple blend wherein said diorganopolysiloxane is not cured.

44 Claims, 1 Drawing Sheet

THERMOPLASTIC SILICONE ELASTOMERS

This application is a continuation in part of Ser. No. 08/837,835 filed Apr. 22, 1997 now abandoned.

FIELD OF THE INVENTION

The present invention relates to thermoplastic elastomer compositions wherein a silicone gum is dispersed in a thermoplastic resin and dynamically vulcanized therein, the resin being selected from polyolefins or poly(butylene teraphthalate).

BACKGROUND OF THE INVENTION

Thermoplastic elastomers (TPEs) are polymeric materials which possess both plastic and rubbery properties. They have elastomeric mechanical properties but, unlike conventional rubbers, they can be re-processed at elevated temperatures. This re-processability is a major advantage of TPEs over chemically crosslinked rubbers since it allows recycling of fabricated parts and results in a considerable reduction of scrap.

In general, two main types of thermoplastic elastomers are known. Block copolymer thermoplastic elastomers contain "hard" plastic segments which have a melting point or glass transition temperature above ambient as well as "soft" polymeric segments which have a glass transition or melt point considerably below room temperature. In these systems, the hard segments aggregate to form distinct microphases and act as physical crosslinks for the soft phase, thereby imparting a rubbery character at room temperature. At elevated temperatures, the hard segments melt or soften and allow the copolymer to flow and to be processed like an ordinary thermoplastic resin.

Alternatively, a thermoplastic elastomer referred to as a simple blend (physical blend) can be obtained by uniformly mixing an elastomeric component with a thermoplastic resin. When the elastomeric component is also cross-linked during mixing, a thermoplastic elastomer known in the art as a thermoplastic vulcanizate (TPV) results.

Since the crosslinked elastomeric phase of a TPV is insoluble and non-flowable at elevated temperature, TPVs generally exhibit improved oil and solvent resistance as well as reduced compression set relative to the simple blends.

Typically, a TPV is formed by a process known as dynamic vulcanization, wherein the elastomer and the thermoplastic matrix are mixed and the elastomer is cured with the aid of a crosslinking agent and/or catalyst during the mixing process. A number of such TPVs are known in the art, including some wherein the crosslinked elastomeric component can be a silicone polymer while the thermoplastic component is an organic, non-silicone polymer (i.e., a thermoplastic silicone vulcanizate or TPSiV). In such a material, the elastomeric component can be cured by various mechanisms, but it has been shown that the use of a non-specific catalyst, such as an organic peroxide, can also result in at least a partial cure of the thermoplastic resin itself, thereby reducing or completely destroying ability to re-process the composition (i.e., it no longer is a thermoplastic elastomer). In other cases, the peroxide can lead to the partial degradation of the thermoplastic resin. To address these problems, elastomer-specific crosslinkers, such as organohydrido silicon compounds, can be used to cure alkenyl-functional elastomers.

Arkles, in U.S. Pat. No. 4,500,688, discloses semi-interpenetrating networks (IPN) wherein a vinyl-containing silicone fluid having a viscosity of 500 to 100,000 cS is dispersed in a conventional thermoplastic resin. Arkles only illustrates these IPNs at relatively low levels of silicone. The vinyl-containing silicone is vulcanized in the thermoplastic during melt mixing according to a chain extension or crosslinking mechanism which employs a silicon hydride-containing silicone component. This disclosure states that the chain extension procedure results in a thermoplastic composition when the vinyl-containing silicone has 2 to 4 vinyl groups and the hydride-containing silicone has 1 to 2 times the equivalent of the vinyl functionality. On the other hand, silicones which predominantly undergo crosslinking reaction result in thermoset compositions when the vinyl-containing silicone has 2 to 30 vinyl groups and the hydride-containing silicone has 2 to 10 times the equivalent of the vinyl functionality. Typical thermoplastics mentioned include polyamides, polyurethanes, styrenics, polyacetals and polycarbonates. This disclosure is expanded by Arkles in U.S. Pat. No. 4,714,739 to include the use of hybrid silicones which contain unsaturated groups and are prepared by reacting a hydride-containing silicone with an organic polymer having unsaturated functionality. Although Arkles discloses a silicone fluid content ranging from 1 to 40 weight percent (1 to 60% in the case of the '739 patent), there is no suggestion of any criticality as to these proportions.

In WO 96/01291 to Advanced Elastomer Systems, thermoplastic elastomers having improved resistance to oil and compression set are disclosed. These systems are prepared by first forming a cured rubber concentrate wherein a curable elastomeric copolymer is dispersed in a polymeric carrier not miscible therewith, the curable copolymer being dynamically vulcanized while this combination is mixed. The resulting rubber concentrate is, in turn, blended with an engineering thermoplastic to provide the desired TPE. Silicone rubber is disclosed as a possible elastomeric component, but no examples utilizing such a silicone are provided. Further, this publication specifically teaches that the polymeric carrier must not react with the cure agent for the curable copolymer.

Although the above publications disclose the preparation of compositions using various thermoplastic resins as the matrix and a dispersed phase consisting of a silicone elastomer which is dynamically vulcanized, neither these references, nor any art known to applicants, teaches that only certain thermoplastics benefit from the curing of the dispersed silicone component. That is, there is no indication that an improvement in mechanical properties of the TPSiV relative to a corresponding simple blend of the thermoplastic and the uncured silicone would result for only certain thermoplastic resins. This is, of course, of great commercial significance since the vulcanization procedure, and the cure agents required therefor, add to both the complexity as well as the expense of the preparation and vulcanization would be avoided in many applications if essentially identical mechanical properties could be obtained without its employ.

SUMMARY OF THE INVENTION

It has now been discovered that many prior art compositions wherein a dispersed silicone phase is cured in a thermoplastic via a hydrosilation mechanism actually derive little or no benefit from vulcanization of the elastomeric silicone component. For example, these compositions based on certain species of thermoplastic resins such as polystyrene (PS) or polyethylene teraphthalate (PET), generally exhibit tensile strengths or elongations which are essentially no different from values of corresponding simple blends of the respective thermoplastic resin and uncured silicone polymer. Compositions based on these thermoplastics often have poor appearance at high silicone contents and exhibit low mechanical strength and elongation. To the contrary, a significant increase in tensile strength and elongation relative to the corresponding simple blend is obtained according to the method of the present invention when the TPSiV is prepared from certain thermoplastic resins and a silicone gum. Thus, unlike the teachings of Arkles, cited supra, the silicone polymer which is dispersed in the thermoplastic must be a high molecular weight gum, rather than a low viscosity silicone fluid, the latter resulting in compositions having poor uniformity. Furthermore, even when such a gum is used in combination with the specific resins of the present invention to prepare the TPSiV, it has been found that there is a critical range of silicone content over which the above mentioned improved tensile and elongation properties are realized. Moreover, contrary to the teaching of WO 96/01291, many of the thermoplastic components of the instant compositions are reactive with respect to the organohydrido silicon compound (cure agent), as defined infra.

The present invention, therefore, relates to a thermoplastic elastomer prepared by a method comprising:
(I) mixing
(A) a thermoplastic resin selected from the group consisting of a polyolefin and a poly (butylene terephthalate),
(B) a diorganopolysiloxane having a plasticity of at least 30 and having an average of at least 2 alkenyl radicals in its molecule,
(C) an organohydrido silicon compound which contains an average of at least 2 silicon-bonded hydrogen groups in its molecule,
(D) optionally, a reinforcing filler and
(E) a hydrosilation catalyst,
components (C) and (E) being present in an amount sufficient to cure said diorganopolysiloxane (B); and
(II) dynamically curing said diorganopolysiloxane (B),
wherein the amount of said diorganopolysiloxane (B) used is such that at least one property of the thermoplastic elastomer selected from tensile strength or elongation is at least 25% greater than the respective property for a corresponding simple blend wherein said diorganopolysiloxane is not cured and said thermoplastic elastomer has an elongation of at least 25%.

DETAILED DESCRIPTION OF THE INVENTION

Figure 1:
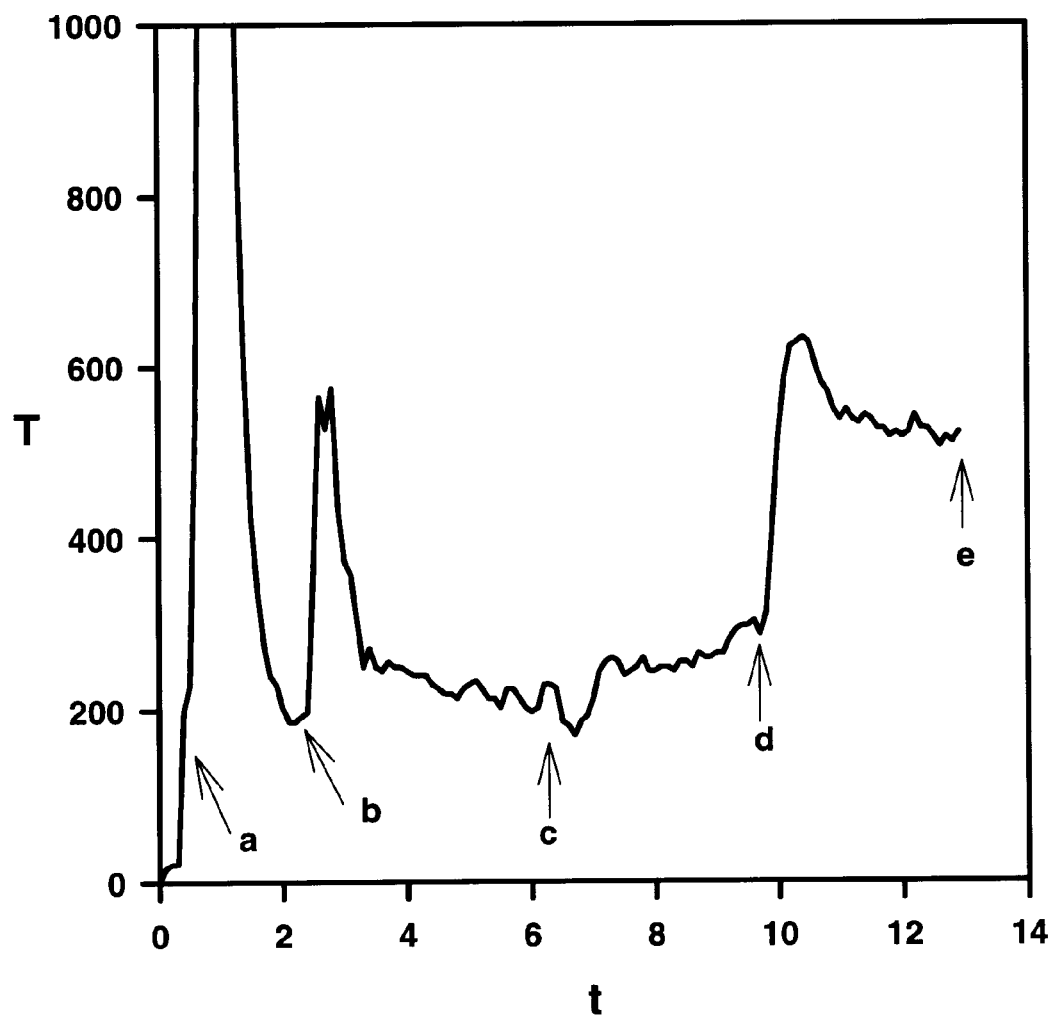
FIG. 1 is a plot of the torque (T) during dispersion of a vinyl-functional polydimethylsiloxane rubber composition in a poly(butylene terephthalate) resin and subsequent dynamic vulcanization of the polydimethylsiloxane as a function of time (t).

Component (A) of the present invention is a thermoplastic resin, or a blend of two or more such resins, selected from polyolefin resins or poly(butylene teraphthalate) resins having a melt point ($T_m$) above room temperature (RT). This component is a polymer or copolymer which is not crosslinked and, although it is a solid under normal ambient conditions, it readily flows upon the application of a shearing stress when heated above its melt point (i.e., melt flow).

The polyolefin resin may be selected from homopolymers of olefins as well as interpolymers of one or more olefins with each other and/or up to about 40 mole percent of one or more monomers which are copolymerizable with the olefins. Examples of suitable polyolefins include homopolymers of ethylene, propylene, butene-1, isobutylene, hexene, 1,4methylpentene-1, pentene-1, octene-1, nonene-1 and decene-1, inter alia. These polyolefins can be prepared using peroxide, Ziegler-Natta or metallocene catalysts, as well known in the art. Interpolymers of two or more of the above mentioned olefins may also be employed as component (A) and they may also be copolymerized with, e.g., vinyl or diene compounds or other such compounds which can be copolymerized with the olefins.

Specific examples of suitable interpolymers are ethylene-based copolymers, such as ethylene-propylene copolymers, ethylene-butene-1 copolymers, ethylene-hexene-1 copolymers, ethylene-octene-1 copolymers, ethylene-butene-1 copolymers and interpolymers of ethylene with two or more of the above mentioned olefins.

The polyolefin may also be a blend of two or more of the above mentioned homopolymers or interpolymers. For example, the blend can be a uniform mixture of one of the above systems with one or more of the following: polypropylene, high pressure, low density polyethylene, high density polyethylene, polybutene-1 and polar monomer-containing olefin copolymers such as ethylene/acrylic acid copolymers, ethylene/acrylic acid copolymers, ethylene/methyl acrylate copolymers, ethylene/ethyl acrylate copolymers, ethylene/vinyl acetate copolymers, ethylene/acrylic acid/ethyl acrylate terpolymers and ethylene/acrylic acid/vinyl acetate terpolymers, inter alia.

Preferred polyolefins include polyethylene (PE) polymers such as low pressure, substantially linear, ethylene homopolymers and interpolymers of ethylene with alpha-olefins having 3 to 10 carbon atoms, such interpolymers being known as linear low density polyethylene (LLDPE) in the art. Preferably, these systems have a density of about 0.85 to 0.97 g/cc, more preferably 0.875 to 0.930 g/cc, and weight average molecular weight of about 60,000 to about 1,000,000.

Other preferred polyolefins include PP resins, including atactic, syndiotactic or isotactic PP. These are typically homopolymers of propylene or interpolymers of propylene with minor proportions of ethylene. Such PP systems can have the ethylene polymerized randomly with propylene units or a number of ethylene units may be linked to form a block copolymer.

Poly(butylene teraphthalate) (PBT) resins of the invention are polymers prepared by a condensation reaction between 1,4-butanediol and terephthalic acid. These reactants may also be copolymerized with other glycols or polyols to modify crystallinity, clarity and various other characteristics. For example, 1,4-butanediol and terephthalic acid can be copolymerized with minor amounts of neopentyl glycol or trimethylol propane, as is known in the art. Other systems include block copolymers of PBT and polyalkylene glycols, such as poly(tetramethylene oxide)and poly(ethylene oxide). The PBT resins may also be blended with other thermoplastic resins, such as polycarbonates and polyesters to form alloys which are suitable for use as component (A).

The above polymers and interpolymers are well known in the art and further description thereof is considered unnecessary.

When thermoplastic elastomers are prepared from the above resins according to the method of the present invention, described infra, they generally have good appearance and have a tensile strength and/or elongation at least 25% greater than the corresponding simple blend wherein the diorganopolysiloxane is not cured. To the contrary, when certain other resins, such as polystyrene (PS) and polyethylene teraphthalate (PET), are compounded with the diorganopolysiloxane and cure agents therefor and the diorganopolysiloxane is dynamically vulcanized according to the methods described infra, the resulting thermoplastic elastomer has little integrity, low tensile strength and low elongation and are generally comparable to simple blends.

Diorganopolysiloxane (B) is a high consistency (gum) polymer or copolymer which contains at least 2 alkenyl radicals having 2 to 20 carbon atoms in its molecule. The alkenyl group is specifically exemplified by vinyl, allyl, butenyl, pentenyl, hexenyl and decenyl. The position of the alkenyl functionality is not critical and it may be bonded at the molecular chain terminals, in non-terminal positions on the molecular chain or at both positions. It is preferred that the alkenyl group is vinyl or hexenyl and that this group is present at a level of 0.001 to 3 weight percent, preferably 0.01 to 1 weight percent, in the diorganopolysiloxane gum.

The remaining (i.e., non-alkenyl) silicon-bonded organic groups in component (B) are independently selected from hydrocarbon or halogenated hydrocarbon groups which contain no aliphatic unsaturation. These may be specifically exemplified by alkyl groups having 1 to 20 carbon atoms, such as methyl, ethyl, propyl, butyl, pentyl and hexyl; cycloalkyl groups, such as cyclohexyl and cycloheptyl; aryl groups having 6 to 12 carbon atoms, such as phenyl, tolyl and xylyl; aralkyl groups having 7 to 20 carbon atoms, such as benzyl and phenethyl; and halogenated alkyl groups having 1 to 20 carbon atoms, such as 3,3,3-trifluoropropyl and chloromethyl. It will be understood, or course, that these groups are selected such that the diorganopolysiloxane gum (B) has a glass temperature (or melt point) which is below room temperature and the gum is therefore elastomeric. Methyl preferably makes up at least 85, more preferably at least 90, mole percent of the non-unsaturated silicon-bonded organic groups in component (B).

Thus, polydiorganosiloxane (B) can be a homopolymer, a copolymer or a terpolymer containing such organic groups. Examples include gums comprising dimethylsiloxy units and phenylmethylsiloxy units; dimethylsiloxy units and diphenylsiloxy units; and dimethylsiloxy units, diphenylsiloxy units and phenylmethylsiloxy units, among others. The molecular structure is also not critical and is exemplified by straight-chain and partially branched straight-chain, linear structures being preferred.

Specific illustrations of organopolysiloxane (B) include: trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and similar copolymers wherein at least one end group is dimethylhydroxysiloxy. Preferred systems for low temperature applications include methylphenylsiloxane-dimethylsiloxane-methylvinylsiloxane copolymers and diphenylsiloxane-dimethylsiloxane-methylvinylsiloxane copolymers, particularly wherein the molar content of the dimethylsiloxane units is about 93%.

Component 03) may also consist of combinations of two or more organopolysiloxanes. Most preferably, component (B) is a polydimethylsiloxane homopolymer which is terminated with a vinyl group at each end of its molecule or is such a homopolymer which also contains at least one vinyl group along its main chain.

For the purposes of the present invention, the molecular weight of the diorganopolysiloxane gum is sufficient to impart a Williams plasticity number of at least about 30 as determined by the American Society for Testing and Materials (ASTM) test method 926. The plasticity number, as used herein, is defined as the thickness in millimeters×100 of a cylindrical test specimen 2 $cm^3$ in volume and approximately 10 mm in height after the specimen has been subjected to a compressive load of 49 Newtons for three minutes at 25° C. When the plasticity of this component is less than about 30, as in the case of the low viscosity fluid siloxanes employed by Arkles, cited supra, the TPSiVs prepared by dynamic vulcanization according to the instant method exhibit poor uniformity such that at high silicone contents (e.g., 30 to 70 weight percent) there are regions of essentially only silicone and those of essentially only thermoplastic resin, and the blends are weak and friable. Although there is no absolute upper limit on the plasticity of component (B), practical considerations of processability in conventional mixing equipment generally restrict this value. Preferably, the plasticity number should be about 100 to 200, most preferably about 120 to 185.

Methods for preparing high consistency unsaturated group-containing polydiorganosiloxanes are well known and they do not require a detailed discussion in this specification. For example, a typical method for preparing an alkenyl-functional polymer comprises the base-catalyzed equilibration of cyclic and/or linear diorganopolysiloxanes in the presence of similar alkenyl-functional species.

The organohydrido silicon compound (C) is a crosslinker (cure agent) for diorganopolysiloxane (B) of present composition and is an organopolysiloxane which contains at least 2 silicon-bonded hydrogen atoms in each molecule, but having at least about 0.2 weight percent hydrogen, preferably 0.2 to 2 and most preferably 0.5 to 1.7, percent hydrogen bonded to silicon. Those skilled in the art will, of course, appreciate that either component (B) or component (C), or both, must have a functionality greater than 2 if diorganopolysiloxane (B) is to be cured (i.e., the sum of these functionalities must be greater than 4 on average). The position of the silicon-bonded hydrogen in component (C) is not critical, and it may be bonded at the molecular chain terminals, in non-terminal positions along the molecular chain or at both positions. The silicon-bonded organic groups of component (C) are independently selected from any of the hydrocarbon or halogenated hydrocarbon groups described above in connection with diorganopolysiloxane (B), including preferred embodiments thereof. The molecular structure of component (C) is also not critical and is exemplified by straight-chain, partially branched straight-chain, branched, cyclic and network structures, linear polymers or copolymers being preferred, this component should be compatible with diorganopolysiloxane (B) (i.e., it is effective in curing component (B)).

Component (C) is exemplified by the following:
low molecular siloxanes, such as $PhSi(OSiMe_2H)_3$;
trimethylsiloxy-endblocked methylhydridopolysiloxanes;
trimethylsiloxy-endblocked dimethylsiloxane-methylhydridosiloxane copolymers;
dimethylhydridosiloxy-endblocked dimethylpolysiloxanes;
dimethylhydrogensiloxy-endblocked methylhydrogenpolysiloxanes;
dimethylhydridosiloxy-endblocked dimethylsiloxane-methylhydridosiloxane copolymers;
cyclic methylhydrogenpolysiloxanes;
cyclic dimethylsiloxane-methylhydridosiloxane copolymers;

tetrakis(dimethylhydrogensiloxy)silane;

silicone resins composed of $(CH_3)_2HSiO_{1/2}$, $(CH_3)_3SiO_{1/2}$, and $SiO_{4/2}$ units; and silicone resins composed of $(CH_3)_2HSiO_{1/2}$, $(CH_3)_3SiO_{1/2}$, $CH_3SiO_{3/2}$, $PhSiO_{3/2}$ and $SiO_{4/2}$ units, wherein Me and Ph hereinafter denote methyl and phenyl radicals, respectively.

Particularly preferred organohydrido silicon compounds are polymers or copolymers with RHSiO units ended with either $R_3SiO_{1/2}$ or $HR_2SiO_{1/2}$, wherein R is independently selected from alkyl radicals having 1 to 20 carbon atoms, phenyl or trifluoropropyl, preferably methyl. It is also preferred that the viscosity of component (C) is about 0.5 to 1,000 mPa-s at 25° C., preferably 2 to 500 mPa-s. Further, this component preferably has 0.5 to 1.7 weight percent hydrogen bonded to silicon. It is highly preferred that component (C) is selected from a polymer consisting essentially of methylhydridosiloxane units or a copolymer consisting essentially of dimethylsiloxane units and methylhydridosiloxane units, having 0.5 to 1.7 percent hydrogen bonded to silicon and having a viscosity of 2 to 500 mPa-s at 25° C. It is understood that such a highly preferred system will have terminal groups selected from trimethylsiloxy or dimethylhdridosiloxy groups.

Component (C) may also be a combination of two or more of the above described systems. The organohydrido silicon compound (C) is used a level such that the molar ratio of SiH therein to Si-alkenyl in component (B) is greater than 1 and preferably below about 50, more preferably 3 to 20, most preferably 6 to 12.

These SiH-functional materials are well known in the art and many of them are commercially available.

The instant compositions also preferably comprise a reinforcing filler (D), these compositions having improved mechanical properties relative to those that do not employ the filler. This optional component is any filler which is known to reinforce diorganopolysiloxane (B) and is preferably selected from finely divided, heat stable minerals such as fumed and precipitated forms of silica, silica aerogels and titanium dioxide having a specific surface area of at least about 50 $m^2$/gram. The fumed form of silica is a preferred reinforcing filler based on its high surface area, which can be up to 450 $m^2$/gram and a fumed silica having a surface area of 50 to 400 $m^2$/g, most preferably 200 to 380 $m^2$Ig, is highly preferred. When used, filler (D) is added at a level of about up to 200 parts by weight, preferably 5 to 150 and most preferably 20 to 100 parts by weight, for each 100 parts by weight of component (B).

If a fumed silica filler is employed, it is preferably treated to render its surface hydrophobic, as typically practiced in the silicone rubber art. This can be accomplished by reacting the silica with a liquid organosilicon compound which contains silanol groups or hydrolyzable precursors of silanol groups. Compounds that can be used as filler treating agents, also referred to as anti-creping agents or plasticizers in the silicone rubber art, include such ingredients as low molecular weight liquid hydroxy- or alkoxy-terminated polydiorganosiloxanes, hexaorganodisiloxanes, cyclodimethylsilazanes and hexaorganodisilazanes. It is preferred that the treating compound is an oligomeric hydroxy-terminated diorganopolysiloxane having an average degree of polymerization (DP) of 2 to about 100, more preferably about 2 to about 10 and it is used at a level of about 5 to 50 parts by weight for each 100 parts by weight of the silica filler. When component (B) is the preferred vinyl-functional or hexenyl-functional polydimethylsiloxane, this treating agent is preferably a hydroxy-terminated polydimethylsiloxane.

Hydrosilation catalyst (E) is a catalyst that accelerates the cure of diorganopolysiloxane (B) in the present composition. This hydrosilation catalyst is exemplified by platinum catalysts, such as platinum black, platinum supported on silica, platinum supported on carbon, chloroplatinic acid, alcohol solutions of chloroplatinic acid, platinumnolefin complexes, platinum/alkenylsiloxane complexes, platinum/beta-diketone complexes, platinum/phosphine complexes and the like; rhodium catalysts, such as rhodium chloride and rhodium chloride/di(n-butyl)sulfide complex and the like; and palladium catalysts, such as palladium on carbon, palladium chloride and the like. Component (E) is preferably a platinum-based catalyst such as chloroplatinic acid; platinum dichloride; platinum tetrachloride; a platinum complex catalyst produced by reacting chloroplatinic acid and divinyltetramethyldisiloxane which is diluted with dimethylvinylsiloxy endblocked polydimethylsiloxane, prepared according to U.S. Pat. No. 3,419,593 to Willing; and a neutralized complex of platinous chloride and divinyltetramethyldisiloxane, prepared according to U.S. Pat. No. 5,175,325 to Brown et al., these patents being hereby incorporated by reference. Most preferably, catalyst (E) is a neutralized complex of platinous chloride and divinyltetramethyldisiloxane.

Component (E) is added to the present composition in a catalytic quantity sufficient to promote the reaction of components (B) and (C) and thereby cure the diorganopolysiloxane. For example, the catalyst is typically added so as to provide about 0.1 to 500 parts per million (ppm) of metal atoms based on the total weight of the thermoplastic elastomer composition, preferably 0.25 to 50 ppm.

In addition to the above mentioned major components (A) though (E), a minor amount (i.e., less than 50 weight percent of the total composition) an optional additive (F) can be incorporated in the TPSiV compositions of the present invention. This optional additive can be illustrated by, but are not limited to, extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, flame retardants such as halogenated hydrocarbons, alumina trihydrate, magnesium hydroxide, organophosphorous compounds and other fire retardant (FR) materials. These additives are typically added to the final TPSiV composition after dynamic cure, but they may also be added at any point in the preparation provided they do not interfere with the dynamic vulcanization mechanism.

According to the method of the present invention, the thermoplastic elastomer is preferably prepared by thoroughly dispersing diorganopolysiloxane (B), and optionally component (D), in thermoplastic (A) and dynamically vulcanizing the diorganopolysiloxane using organohydrido silicon compound (C) and catalyst (E). Mixing is carried out in any device which is capable of uniformly dispersing the components in the resin, such as an internal mixer or a twin-screw extruder, the latter being preferred for commercial preparations wherein the temperature is preferably kept as low as practical consistent with good mixing so as not to decompose the resin. Order of mixing is not critical and, for example, components (B) through (D) can be separately introduced and mixed with the thermoplastic resin before dynamic vulcanization begins. However, components (B) through (D) should be well dispersed in thermoplastic (A) before catalyst (E) is added and dynamic vulcanization begins. Optimum temperatures, mixing times and other conditions of the mixing operation depend upon the particular resin and other components under consideration and these may be determined by routine experimentation by those skilled in the art.

In a preferred mixing procedure, thermoplastic resin (A) is first melted in an internal mixer at a controlled temperature which is above the melt point to about 100° C. above the melt point of the resin and a master blend of components (B) through (D) is mixed in for about 2 to 10 minutes. Thus, for example, this range is from the respective melt point of the resin to 200° C. for PP and PE and up to 280° C. for PBT. This master blend can be prepared by mixing diorganopolysiloxane (B) with organohydrido silicon compound (C), filler (D), when used, and any optional inhibitors, stabilizers, plasticizers or other additives for component (B), this mixing being carried out, e.g., on a two-roll mill at room temperature. Such a mixture of gum, filler and various additives is known as a rubber base in the silicone rubber art, and the cure agent (C) may be included therein or it may be added just prior to cure. When a thermoplastic elastomer having a low durometer (i.e., softer) is desired, about 10 to 50 parts by weight of a diorganopolysiloxane fluid having a viscosity of about 10,000 to 100,000 mPa-s at 25° C. per 100 parts by weight of components (B) and (D) may be included in the silicone base. As the master blend is introduced, the viscosity of the composition increases and then levels off. Once a uniform dispersion has been obtained, catalyst (E) is added and the viscosity again increases, and then levels off, as mixing is continued and the silicone gum is dynamically vulcanized for a time sufficient to again establish a steady state melt viscosity, typically about 1 to 30 minutes. In the case of PBT, it is particularly preferred that all mixing and dynamic curing is conducted under an inert (i.e., non-oxidizing) atmosphere such as nitrogen.

In another preferred embodiment, the above described master blend (i.e., components (B), (D) and optionally (C)) is introduced to the mixer and the thermoplastic resin is then added and the system dynamically cured, as above.

In another preferred embodiment, the above mixing is carried out in a twin-screw extruder wherein resin (A) is fed to the extruder through a hopper and components (B) through (E) are introduced into the extruder, with the catalyst (E) being separately fed in at a location furthest downstream. In a variation of this procedure, the filler is introduced along with the resin through the hopper. Preferably, the extruder size is sufficient to accomplish the mixing and curing in one pass.

As noted above, in order to be within the scope of the present invention, the tensile strength or elongation, or both, of the TPSiVs must be at least 25% greater than that of a corresponding simple blend. A further requirement of the invention is that the TPSiV has at least 25% elongation, as determined by the test described infra. In this context, the term "simple blend" denotes a composition wherein the weight proportions of thermoplastic resin (A), diorganopolysiloxane (B) and filler (D), if used, are identical to the proportions in the TPSiV, but no cure agents are employed (i.e., either component (C) or (E), or both, are omitted and the gum is therefore not cured). In order to determine if a particular composition meets the above criterion, the tensile strength of the TPSiV is measured on dumbbells having a length of 25.4 mm and a width of 3.2 mm and a typical thickness of 1 to 2 mm, according to ASTM method D 412, at an extension rate of 50 nm/min. Three such samples are evaluated and the one having the maximum reading is selected for comparison of tensile and elongation values. These values are then compared to the corresponding values of a sample prepared from the simple blend composition having a maximum tensile strength. It has been observed that when the level of the silicone component is too low, at least a 25% improvement in tensile and/or elongation over the simple blend is not realized and there is no benefit derived from the dynamic vulcanization, at least with respect to strength. Although the range of diorganopolysiloxane consistent with this requirement depends upon the particular thermoplastic resin and other components selected, it is preferred to use about 25% to 75%, more preferably 25 to 60%, of thermoplastic resin (A) based on the total weight of components (A) through (E). However, the upper limit of silicone content is determined by processability considerations since too high a level results in at least a partially crosslinked composition. This limit is the highest level of components (B) and (D), when used, which allows the TPSiV to be readily processed by conventional plastic operations such as molding and extrusion. A thermoplastic elastomer of the present invention which has been re-processed in this manner typically has mechanical properties which are approximately the same as those of the initial TPSiV.

The thermoplastic elastomer prepared by the above described method can then be processed by conventional techniques, such as extrusion, vacuum forming, injection molding, blow molding or compression molding, to fabricate plastic parts. Moreover, these compositions can be re-processed (recycled) with little or no degradation of mechanical properties.

The novel thermoplastic elastomers of the present invention can be used for wire and cable insulation, sealing, automotive and appliance components, belts and hoses, construction seals, bottle closures and general rubber applications.

EXAMPLES

The following examples are presented to further illustrate the compositions and method of this invention, but are not to be construed as limiting the invention, which is delineated in the appended claims. All parts and percentages in the examples are on a weight basis and all measurements were obtained at 25° C., unless indicated to the contrary.

Materials

The following materials, listed alphabetically for ease of reference, were employed in the examples.

BASE 1 is a silicone rubber base made from 68.7% PDMS 1, defined infra, 25.8% of a fumed silica having a surface area of about 250 m$^2$/g, 5.4% of a hydroxy-terminated diorganopolysiloxane having an average degree of polymerization (DP) of about 4 and 0.02% of ammonium carbonate.

BASE 2 is a silicone base made from 59.3 wt % PDMS 1, 32.6% of fumed silica having a surface area of about 250 m$^2$/g, 2.1% of a resin consisting essentially of $(CH_3)SiO_{3/2}$, $(CH_3)_2 SiO_{2/2}$, $CH_3ViSiO_{2/2}$, $PhSiO_{3/2}$ units and $(CH_3)_3SiO_{1/2}$, in a molar ratio of 16:61:41:8:1, in which Vi hereinafter denotes a vinyl radical, and 5.9% of a hydroxy-terminated diorganopolysiloxane having an average degree of polymerization (DP) of about 4.

BASE 3 is silicone rubber powder consisting of 4% of a hydroxy-terminated polydimethylsiloxane fluid having a an average degree of polymerization (DP) of about 4, 57% of PDMS 1, and 39% of SILICA, described infra. This powder was prepared according to the methods described in U.S. Pat. No. 5,391,594 to Romenesko et al., hereby incorporated by reference.

BASE 4 is a silicone rubber base made from 76.6% PDMS 1, defined infra, 17.6% of a fumed silica having a surface area of about 250 m²/g, 5.7% of a hydroxy-terminated diorganopolysiloxane having an average degree of polymerization (DP) of about 4 and 0.02% of ammonium carbonate.

CAS is calcium stearate.

CATALYST 1 is a 1.5% platinum complex of 1,3-diethenyl-1,1,3,3-tetramethyldisiloxane; 5.0% tetramethyldivinyldisiloxane; 93% dimethylvinyl-ended polydimethylsiloxane and 0.5% dimethylcyclopolysiloxanes having 6 or greater dimethylsiloxane units.

CATALYST 2 is a 0.62% platinum complex of 1,3-diethenyl-1,1,3,3-tetramethyldisiloxane; 7.4% tetramethyldivinyldisiloxane; 92% dimethylvinyl ended polydimethylsiloxane and 0.6% dimethylcyclopolysiloxanes having 6 or greater dimethylsiloxane units.

EPDM is an ethylene-propylene-diene monomer terpolymer, Polysar™ EPDM 585, marketed by Polysar, Akron, Ohio.

HTA is a blend of 50% of a hydroxy-terminated polydimethylsiloxane gum having a plasticity of about 165 and 50% cerium hydrate.

PBT 1 is a poly(butylene terephthalate) resin having a melt point of 227° C. and marketed by Aldrich (Milwaukee, Wis.).

PBT 2 is a poly(butylene terephthalate) resin having a melt point of 227° C., Ultradur™ B4500, marketed by BASF, Bridgeport, N.J.

PDMS 1 is a gum consisting of 99.6 wt % $Me_2SiO$ units, 0.16% MeViSiO units and 0.17% $Me_2ViSiO_{1/2}$ units. Prepared by potassium catalyzed equilibration of cyclic siloxanes wherein the catalyst is neutralized with carbon dioxide. This gum has plasticity of about 150.

PDMS 2 is a gum similar to PDMS 1 but neutralized with both carbon dioxide and a silyl phosphate. This gum has plasticity of about 150.

PDMS 3 is a linear trimethylsiloxy-terminated polydimethylsiloxane fluid having a viscosity of about 60,000 mPa-s.

PDMS 4 is a linear trimethylsiloxy-terminated polydimethylsiloxane fluid having a viscosity of about 100 mPa-s.

PDMS 5 is a linear dimethylvinysiloxy-terminated polydimethylsiloxane fluid having a viscosity of about 2,000 mPa-s.

PE is a low density polyethylene (LDPE) resin 5004IM having a melt index of 4 and marketed by Dow Chemical Co., Midland, Mich.

PE2=a linear, low density polyethylene; an octene-based copolymer of ethylene marketed under the trade name DOWLEX™ 2035 by the Dow Chemical Co.

PEROXIDE is a dicumyl peroxide catalyst, Di-Cup® R marketed by Hercules, Wilmington, Del.

PET is a poly(ethylene terephthalate) resin, number 8006, marketed by Shell, Houston, Tex.

POE is a polyolefin elastomer, Engage™ 8401, marketed by Dow Chemical Co., Midland, Mich.

PP is a polypropylene resin, Escorene™ 3445, having a melt index of 35, a melt point of 150° C. and marketed by Exxon, Houston, Tex.

PP 2 is Amoco™ 6284 polypropylene resin having a melt index of 2.2 and marketed by Amoco (Chicago, Ill.).

PS is a polystyrene resin having a glass transition temperature of 95° C., Styron® 612, marketed by the Dow Chemical Co., Midland, Mich.

PTFE is a polytetrafluoroethylene powder, TEFLON® 6C, marketed by E. I. DuPont, Wilmington, Del.

SEBS is a styrene-ethylene-butylene-styrene block copolymer, Kraton™ 1652, marketed by Shell, Houston, Tex.

SILICA is a fumed silica filler having a surface area of about 250 m²/g and marketed under the trade name of Cab-O-Sil® MS-75 by Cabot Corp., Tuscola, Ill.

STAB is a stabilizer, IRGANOX™ 1010, marketed by Ciba-Geigy (Additives Division, Hawthorne, N.Y.) and described as tetrakis{methylene(3,5-di-tert-butyl-4-hydroxy-hydrocinnamate)}methane.

X-LINKER 1 is an SiH-functional crosslinker consisting essentially of 65.6% MeHSiO units, 32.3% $Me_2SiO$ units and 1.8% $Me_3SiO_{1/2}$ units.

X-LINKER 2 is an SiH-functional crosslinker consisting essentially of 36.4% MeHSiO units, 23.6% $Me_2SiO$ units and 15% $Me_3SiO_{1/2}$ units.

X-LINKER 3 is an SiH-functional crosslinker consisting essentially of a liquid trimethylsiloxy-terminated polymethylhydrogensiloxane having a silicon-bonded hydrogen content of about 1.6 weight percent.

X-LINKER 4 is an SiH-functional crosslinker prepared by silylating 30 mole % of 1-octene with the above described X-LINKER 3 using $H_2PtCl_6$ as catalyst to provide a product having a silicon-bonded hydrogen content of about 1.1 weight percent.

Sample Preparation

Preparation of thermoplastic elastomers of the invention, and Comparative examples, was carried out in a 60 ml Haake internal mixer (except as indicated) equipped with sigma blades at the indicated times and temperatures. In a typical procedure, the thermoplastic resin was added to the pre-heated mixer and melted for about 2 to 3 minutes. The diorganopolysiloxane gum (or silicone base) was added and mixed for 2 to minutes, whereupon the crosslinker and catalyst were added and mixing was continued to allow dynamic vulcanization of the silicone component, generally at a blade speed of about 50 to 100 rpm. Alternatively, the base was added first and the resin was mixed therewith before addition of cure agent (C) and catalyst.

The reactivity of the thermoplastic resin was determined in a similar procedure at the same temperature as used to prepare the TPSiVs. In this case, the resin was melted, X-LINKER 1 was added and, after a steady state torque was obtained, CATALYST 2 was added, the exact amounts of each component being indicated below.

After a given thermoplastic elastomer was prepared according to the above procedure, the composition was compression molded for about 5 to 10 minutes at the indicated temperature and allowed to cool under pressure to provide slabs having a thickness of about 1 to 2 mm. These slabs were stored at room temperature for at least 16 hours and were then cut into dumbbells using an ASTM (American Society for Testing Materials) die having a test length of 25.4 mm and test width of 3.2 mm. Three such samples were tested by a method similar to ASTM D 412 using a Sintech™ machine (MTS Systems, Corp., Research Triangle Park, N.C.) at a test speed of 50 mm/min. Nominal tensile strength (i.e., based on the initial cross-sectional area) and elongation at break was reported for the sample having the greatest tensile value. In the case of the polyethylene samples, the average value of tensile and elongation were calculated based on three bars each and these values were close to the maximum values. In some cases, the modulus at 50% elongation was also calculated (50% Mod.). In the case of the POE samples, the tensile test rate was 500 mn/min.

Durometer was determined using either a Shore A (soft) or Shore D (hard) test instrument (Shore Instrument & Mfg., New York, N.Y.).

Additionally, compression set was determined by ASTM method D 395, method B, at the indicated temperature.

(Comparative) Example I

PET (66.7 g) was added to the internal mixer at 275° C. X-LINKER 1 (1.2 g) was added and mixed for several min. Torque was stable at 175 m-g. CATALYST 2] (0.04 g) was added and mixed for 4 min. The torque did not change (i.e., non-reactive).

(Comparative) Examples II–V

Thermoplastic elastomers were prepared from PET wherein 40 g of the resin was melted at 275° C. for 2 minutes and 26.7 g of gum (Table 1) or base (Table 2) was mixed in for 2 minutes. X-LINKER 1 was added (3 min.) and then CATALYST 2 was introduced. This composition was allowed to mix for 3 minutes as the dispersed polydimethylsiloxane gum (or base) cured. The formulations and resulting tensile properties are reported in Table 1 for the systems employing only gum, and in Table 2 for systems using the base as the silicone component.

TABLE 1

| (Comp.) Example | II Dynamic Cure | III Simple Blend |
|---|---|---|
| PET/PDMS 2 Ratio Composition | 60/40 | 60/40 |
| PDMS 2 | 40 | 40 |
| PET | 60 | 60 |
| X-LINKER 1 | 1.8 | 0 |
| CATALYST 2 | 0.07 | 0 |
| Properties | | |
| durometer, D | 37 | 27 |
| tensile (MPa) | 7.0 | 1.2 |
| elongation (%) | 8 | 2 |

TABLE 2

| (Comp.) Example | IV Dynamic Cure | V Simple Blend |
|---|---|---|
| PET/BASE 1 Ratio Composition | 60/40 | 60/40 |
| BASE 1 | 40 | 40 |
| PET | 60 | 60 |
| X-LINKER 1 | 1.8 | 0 |
| CATALYST 2 | 0.07 | 0 |
| Properties | | |
| durometer, D | 41 | 37 |
| tensile (MPa) | 8.0 | 2.6 |
| elongation (%) | 9 | 2 |

Tables 1 and 2 indicate that materials with low elongations were obtained from blends of PET and either gum or base. Further, these compositions were not uniform.

(Comparative) Example VI

PS resin (66.72 g) was added to the mixer at 190° C. and, when the torque began to level off, X-LINKER 1 (1.19 g) was added over a period of about 4 min. and the torque returned to 600 m-g. CATALYST 2 (0.06 g) was added and no increase in torque was observed (i.e., non-reactive).

(Comparative) Example VII

PS resin (33.3 g) was added to the mixer at 185° C. and BASE 1 (33.3 g) was mixed therewith for 5 min. Torque (at 185–190° C.) was approximately 400 m-g. This simple blend was compression molded but was too brittle to test.

(Comparative) Example VIII

PS resin (33.3 g) was added to the mixer at 185° C. and mixed with BASE 1 (33.3 g) at 75 rpm for 2 min. X-LINKER 1 (1.16 g) was added and mixed for 3 min. Torque was 480 m-g at 185–190° C. CATALYST 2 (0.06 g) was added and the torque immediately increased to 1,120 m-g. After 3 minutes, the blend was removed from the mixer hot and compression molded. One sample broke when removing from the die but two samples were tested. The elongation was very low, 5%. Tensile strength was 5.3 MPa but the material was very brittle and was not a useable TP elastomer.

(Comparative) Example IX

EPDM (35 g) and PP (15 g) were mixed at 190° C. for 15 min. PEROXIDE (0.55 g) was added in 0.25 g increments. Torque increased from 700 to 1,400 m-g. A sample of the product was compression molded to give a non-silicone, rubbery material with tensile strength 10 MPa and elongation of 470%.

(Comparative) Example X

PDMS 1 (35 g) and PP (15 g) were mixed at 190° C. for 15 min. When only 0.1 g of PEROXIDE was added, a rubbery powder formed that could not be melt processed.

(Comparative) Example XI

PP (5.3 parts) was added to the mixer at 160° C. and SEBS (41.3 parts) was mixed therewith for 6 minutes. PDMS 5 (20.9 parts) was added. Torque dropped from 1,400 m-g to zero and while the plastic composition adhered to the blades of the mixer and the fluid could not be dispersed to provide a uniform blend. To this mixture, there was added 1 part of X-LINKER 1 and, after mixing for 3 minutes, 0.6 part of CATALYST 2 was introduced and the combination dynamically cured for 3 minutes. The product was a sticky, rubbery mass and a molded slab exhibited islands of silicone and plastic components. Two further attempts to make a thermoplastic elastomer using PDMS (fluid) resulted in similar poor moldings.

Examples 1–7

Thermoplastic elastomers were prepared wherein PP resin was melted at 155° C. for 2 minutes and a masterbatch of base (Table 3) or gum (Table 4) and X-LINKER 1 was mixed in for 5 minutes. CATALYST 2 was then introduced and this composition was allowed to mix until the torque value reached steady state (4 to 10 minutes) as the dispersed polydimethylsiloxane base (or gum) cured. During cure, the torque increased and the melt temperature rose to 175–185° C. As mentioned above, it is important to control the melt temperature such that the PP does not degrade (i.e., below about 200° C.). The formulations and resulting tensile properties are reported in Table 3 for the systems employing base, and in Table 4 for systems using only gum as the silicone component. Simple blends of the above systems were also prepared under similar conditions where only the resin and base (or gum) were used, and these compositions are also shown in Tables 3 and 4.

TABLE 3

| Type of Blend | Dynamic Cure (Comp.) Example 1 | Simple Blend | Dynamic Cure Example 2 | Simple Blend | Dynamic Cure Example 3 | Simple Blend | Dynamic Cure Example 4 | Simple Blend |
|---|---|---|---|---|---|---|---|---|
| Composition | | | | | | | | |
| BASE 1 | 15 | 15 | 30 | 30 | 50 | 50 | 70 | 70 |
| PP | 85 | 85 | 70 | 70 | 50 | 50 | 30 | 30 |
| X-LINKER 1 | 0.3 | 0 | 0.5 | 0 | 0.9 | 0 | 1.3 | 0 |
| CATALYST 2 | 0.1 | 0 | 0.1 | 0 | 0.1 | 0 | 0.07 | 0 |
| Properties | | | | | | | | |
| Durometer, D | 58 | 60 | 60 | 57 | 49 | 35 | 34 | 3 |
| Tensile (MPa) | 21.6 | 22.4 | 17.4 | 12.5 | 14.1 | 6.0 | 9.6 | 1.0 |
| Elongation (%) | 32 | 510 | 226 | 8 | 312 | 17 | 260 | 17 |
| 50% Mod. (MPa) | — | — | 15.6 | — | 9.1 | — | 4.8 | — |

TABLE 4

| Type of Blend | Dynamic Cure Example 5 | Simple Blend | Dynamic Cure Example 6 | Simple Blend | Dynamic Cure Example 7 | Simple Blend |
|---|---|---|---|---|---|---|
| Composition | | | | | | |
| PDMS 2 | 30 | 30 | 50 | 50 | 70 | 70 |
| PP | 70 | 70 | 50 | 50 | 30 | 30 |
| X-LINKER 1 | 0.5 | 0 | 0.9 | 0 | 1.3 | 0 |
| CATALYST 2 | 0.1 | 0 | 0.1 | 0 | 0.07 | 0 |
| Properties | | | | | | |
| Durometer, D | 55 | 53 | 40 | 40 | 20 | nm |
| Tensile (MPa) | 15.5 | 14.5 | 7.3 | 8.2 | 4.3 | nm |
| Elongation (%) | 238 | 4 | 60 | 19 | 100 | nm |
| 50% Mod. (MPa) | 14.2 | — | 7.0 | — | 3.0 | — | nm = not measurable (behaved like an uncured silicone base)

From Table 3, it can be seen that there is a critical lower limit (i.e., greater than 15% but less than 30%) for the silicone base content where the TPSiV has tensile and elongation values which are at least 25% greater than the respective values for the simple blend. Likewise, an upper limit of silicone base addition of about 70% was observed. TPSiVs made from PP with 85% BASE 1 were not melt processable.

Furthermore, a 2.1049 g sample of the TPSiV of Example 3 (50/50 blend of PP/BASE 1) was enclosed in a 120 mesh aluminum screen bag and the bag was suspended in 200 ml of boiling xylene in a 300 ml flask for 22 hours. The bag was dried at 100° C. in a vacuum oven overnight to determine gel content. All of the PP was dissolved and 93.8% of the original silicone base in the blend remained. Under these conditions a polypropylene control completely dissolved (i.e., 0% gel). This indicates that the silicone component in the TPSiV cured.

Example 8

BASE 1 (32.4 g) and PTFE (1 g) were mixed for 3 minutes at 1 85° C. PP (21.6 g) was added and mixed for 3 minutes. X-LINKER 1 was added in various amounts and mixed in for 2–3 minutes, whereupon CATALYST 2 (0.06 g) was introduced and the mixture cured until steady state was obtained while the temperature was kept below 195° C. The test results for these samples is shown in Table 5, wherein the molar ratios of SiH in X-LINKER 1 to SiVi in PDMS 1 are indicated and Vi hereinafter denotes vinyl radical.

TABLE 5

| SiH/SiVi (Molar Ratio) | 48 | 24 | 12 | 6 | 3 |
|---|---|---|---|---|---|
| Properties | | | | | |
| durometer, D | 39 | 33 | 45 | 44 | 43 |
| tensile (MPa) | 10.9 | 9.1 | 14.9 | 10.5 | 7.3 |
| elongation (%) | 210 | 53 | 324 | 152 | 66 |

Example 9

A TPSiV was prepared as above wherein the gum and filler were added separately. A masterbatch of PDMS 2 (27.2 parts), X-LINKER 1 (0.5 part) and PP (21.7 parts) were mixed at 175° C. SILICA (5.2 parts) was added. After 5 minutes, the silicone phase was dynamically cured with CATALYST 1 (0.09 parts) to give a thermoplastic elastomer having a Shore D durometer of 39; tensile of 7.8 MPa; and 104% elongation.

Examples 10–17

Thermoplastic elastomers were prepared wherein PE resin was melted at 150° C. for 3 minutes. BASE 2, HTA and X-LINKER 1 were pre-mixed to form a masterbatch which was then mixed with the resin for 5 minutes. CATALYST 2 was introduced and the composition was allowed to mix for 10 minutes as the dispersed polydimethylsiloxane base cured. The formulations and resulting average tensile properties are reported in Table 6. Simple blends of the above systems were also prepared under similar conditions where only the resin and base were mixed, and these compositions are also shown in Table 6.

TABLE 6

| Type of Blend | Simple Blend | Dynamic Cure Example 10 | Simple Blend | Dynamic Cure Example 11 | Simple Blend | Dynamic Cure Example 12 | Simple Blend | Dynamic Cure Example 13 |
|---|---|---|---|---|---|---|---|---|
| Composition | | | | | | | | |
| BASE 2 | 80 | 80 | 70 | 70 | 60 | 60 | 50 | 50 |
| PE | 20 | 20 | 30 | 30 | 40 | 40 | 50 | 50 |
| HTA | 0 | 0.8 | 0 | 0.7 | 0 | 0.6 | 0 | 0.5 |
| X-LINKER 1 | 0 | 0.8 | 0 | 0.7 | 0 | 0.6 | 0 | 0.5 |
| CATALYST 2 | 0 | 0.1 | 0 | 0.1 | 0 | 0.1 | 0 | 0.1 |
| Properties | | | | | | | | |
| Tensile (MPa) | 1 | 3.9 | 1.6 | 8.56 | 3.0 | 8.54 | 4.8 | 7.59 |
| Elongation (%) | 34 | 110 | 22 | 356 | 24 | 358 | 70 | 256 |
| Durometer, A | 64 | 76 | 80 | 84 | 86 | 86 | 88 | 89 |

| Type of Blend | Simple Blend | Dynamic Cure Example 14 | Simple Blend | Dynamic Cure Example 15 | Simple Blend | Dynamic Cure Example 16 | Simple Blend | Dynamic Cure (Comp.) Example 17 |
|---|---|---|---|---|---|---|---|---|
| Composition | | | | | | | | |
| BASE 2 | 40 | 40 | 30 | 30 | 20 | 20 | 10 | 10 |
| PE | 60 | 60 | 70 | 70 | 80 | 80 | 90 | 90 |
| HTA | 0 | 0.4 | 0 | 0.3 | 0 | 0.2 | 0 | 0.1 |
| X-LINKER 1 | 0 | 0.4 | 0 | 0.3 | 0 | 0.2 | 0 | 0.1 |
| CATALYST 2 | 0 | 0.1 | 0 | 0.1 | 0 | 0.1 | 0 | 0.1 |
| Properties | | | | | | | | |
| Tensile (MPa) | 4.5 | 7.53 | 8.9 | 7.4 | 8.2 | 8.2 | 8.9 | 9.3 |
| Elongation (%) | 14 | 178 | 80 | 134 | 84 | 308 | 220 | 112 |
| Durometer, A | 92 | 94 | 93 | 93 | 91 | 91 | 90 | 96 |

From Table 6, it can be seen that there is a critical lower limit (i.e., greater than about 10%) for the silicone base content where the TPSiV has tensile and elongation values which are at least 25% greater than the respective values for the simple blend. Likewise, an upper limit of silicone base addition of about 80% as observed. TPSiV made from PE with 90% BASE 2 was not melt processable.

Example 18

A masterbatch was prepared from PDMS 3 (30 parts), HTA (I part), X-LINKER 1 (1 part) and BASE 2 (100 pts). This masterbatch (70 parts) was blended with PE (30 parts) in the internal mixer, as previously described, and catalyzed with CATALYST 2 (0.1 part) to give a TPSiV having a durometer of 78 Shore A, an average tensile of 4.8 MPa and an average elongation of 244%. A corresponding TPSiV which omitted PDMS 3 exhibited a durometer of 84 Shore A, an average tensile of 8.6 MPa and an average elongation of 356%.

Examples 19–26

Thermoplastic elastomers were prepared wherein PBT 2 resin was melted at about 230° C., typically for about 2 minutes, and base (Table 7) or gum (Table 8) was mixed in for 3 about minutes. X-LINKER 1 was added (3 minutes) and then CATALYST 2 was introduced. This composition was allowed to mix for 3 to 20 minutes as the dispersed polydimethylsiloxane base (or gum) cured. The formulations and resulting tensile properties are reported in Table 7 for the systems employing base, and in Table 8 for systems using only gum as the silicone component. A representative torque (T) curve as a function of time (t) for Example 22 is shown in FIG. 1. In FIG. 1 addition and melting of PBT 2 resin is represented by the curve between points (a) and (b), at which time BASE 1 was added. At point (c) X-LINKER 1 was introduced and at point (d) CATALYST 2 was added and dynamic cure proceeded until the composition was removed from the mixer at time (e).

Simple blends of the above systems were also prepared under similar conditions wherein only the resin and base (or gum) were used, and these Comparative compositions are also shown in Tables 7 and 8.

Additionally, PBT 2 (75 g) was melted in the mixer at 230° C. and X-LINKER 1 (1.8 g) was added. Torque was constant for 5 min at 320 m-g. CATALYST 2 (0.015 g) was then added and the torque increased to 1,300 m-g (i.e., the PBT 2 was reactive with respect to the crosslinking agent).

TABLE 7

| Type of Blend | Dynamic Cure Example 19 | Simple Blend | Dynamic Cure Example 20 | Simple Blend | Dynamic Cure Example 21 | Simple Blend |
|---|---|---|---|---|---|---|
| PBT/Silicone Composition | 30/70 | 30/70 | 40/60 | 40/60 | 60/40 | 60/40 |
| BASE 1 | 70 | 70 | 60 | 60 | 40 | 40 |
| PBT 2 | 30* | 30* | 40* | 40* | 60 | 60 |
| X-LINKER 1 | 2.1 | 0 | 2.1 | 0 | 1.4 | 0 |
| CATALYST 2 | 0.2 | 0 | 0.2 | 0 | 0.04 | 0 |
| Properties | | | | | | |
| durometer, D | 31 | — | 37 | 15 | 39 | 45 |
| tensile (MPa) | 13.5 | 0.5 | 15.0 | 3.3 | 16.0 | 11.7 |
| 50% modulus (MPa) | 5.7 | — | 7.7 | — | 15.7 | — |
| elongation (%) | 255 | 20 | 258 | 10 | 55 | 8 |

| Type of Blend | Dynamic Cure Example 22 | Simple blend | Dynamic Cure (Comp.) Example 23 | Simple blend |
|---|---|---|---|---|
| PBT/Silicone Composition | 70/30 | 70/30 | 85/15 | 85/15 |
| BASE 1 | 30 | 30 | 15 | 15 |
| PBT 2 | 70 | 70 | 85 | 85 |
| X-LINKER 1 | 1.4 | 0 | 1.5 | 0 |
| CATALYST 2 | 0.07 | 0 | 1.5 | 0 |
| Properties | | | | |
| durometer, D | 56 | 53 | 65 | 64 |
| tensile (MPa) | 22.0 | 17.5 | 30.1 | 30.4 |
| 50% modulus (MPa) | — | — | — | — |
| elongation (%) | 48 | 17 | 11 | 11 |

*Resin used was PBT 1

TABLE 8

| Type of Blend | Simple Blend Example 24 | Dynamic Cure | Simple Blend Example 25 | Dynamic Cure | Simple Blend Example 26 | Dynamic Cure |
|---|---|---|---|---|---|---|
| Composition | | | | | | |
| PDMS 1 | 70 | 70 | 60 | 60 | 40 | 40 |
| PBT 2 | 30 | 30 | 40 | 40 | 60 | 60 |
| X-LINKER 1 | 0 | 1.8 | 0 | 1.8 | 0 | 1.8 |
| CATALYST 2 | 0 | 0.07 | 0 | 0.07 | 0 | 0.07 |
| Properties | | | | | | |
| durometer, D | nm | 16 | nm | 25 | 44 | 46 |
| tensile (MPa) | nm | 3.8 | nm | 3.8 | 15.3 | 11.7 |
| 50% modulus (MPa) | — | 2.6 | — | — | — | 11.6 |
| elongation (%) | nm | 120 | nm | 31 | 6 | 55 |
| % compression set (150° C./24 hours) | — | 44.2 | — | 62.1 | — | 91.3 | nm = not measurable, samples lacked integrity.

From Table 7, it is again seen that there is a critical lower limit (i.e., greater than 15% but less than 30%) for the silicone base content where the TPSiV has tensile and elongation values which are at least 25% greater than the respective values for the simple blend. Likewise, an upper limit of silicone base addition of above about 70% was observed (i.e., TPSiV containing 85% silicone base was not melt processable).

Examples 27–32

POE was added to the mixer (60 or 300 ml bowl) which was equipped with roller blades and run at 60 rpm at 160° C. After the plastic melted, BASE 1 (or BASE 3) was added and mixed for about 3 min., whereupon X-LINKER 1 was added. After mixing for 4 minutes, CATALYST 1 was added, the relative amounts of these components being indicated in Table 9 (for BASE 1) and Table 10 (for BASE 3). Torque increased from 300 m-g to about 1000 m-g during the preparation of Example 28 (dynamic cure). The components were mixed for 32 minutes and the blends then removed from the mixer. Mechanical test results for the dynamic cure and corresponding simple blend compositions are reported in Tables 9 and 10 for compositions employing BASE 1 and BASE 3, respectively.

TABLE 9

| Type of Blend | Dynamic Cure Example 27 | Simple Blend | Dynamic Cure Example 28 | Simple Blend | Dynamic Cure Example 29 | Simple Blend |
|---|---|---|---|---|---|---|
| Composition | | | | | | |
| BASE 1 | 30 | 30 | 50 | 50 | 70 | 70 |
| POE | 70 | 70 | 50 | 50 | 30 | 30 |
| X-LINKER 1 | 0.9 | 0 | 1.5 | 0 | 2.1 | 0 |
| CATALYST 1 | 0.35 | 0 | 0.35 | 0 | 0.35 | 0 |
| Properties | | | | | | |
| Durometer, A | 74 | 68 | 65 | 56 | 65 | 35 |
| Tensile (Mpa) | 7.2 | 3.1 | 14.2 | 1.6 | 10.4 | 0.4 |
| Elongation (%) | 742 | 448 | 1008 | 236 | 696 | 103 |
| 50% Mod. (Mpa) | 2.3 | 1.7 | 2.2 | 1.0 | 1.3 | 0.3 |

TABLE 10

| Type of Blend | Dynamic Cure Example 30 | Simple Blend | Dynamic Cure Example 31 | Simple Blend | Dynamic Cure Example 32 | Simple Blend |
|---|---|---|---|---|---|---|
| Composition | | | | | | |
| BASE 3 | 30 | 30 | 50 | 50 | 70 | 70 |
| POE | 70 | 70 | 50 | 50 | 30 | 30 |
| X-LINKER 1 | 0.9 | 0 | 1.5 | 0 | 2.3 | 0 |
| CATALYST 1 | 0.62 | 0 | 0.35 | 0 | 0.35 | 0 |
| Properties | | | | | | |
| Durometer, A | 81 | 81 | 80 | 77 | 75 | 75 |
| Tensile (Mpa) | 8.1 | 4.9 | 7.3 | 2.1 | 10.3 | 1.0 |
| Elongation (%) | 675 | 762 | 450 | 72 | 497 | 12 |
| 59% Mod. (Mpa) | 3.2 | 2.5 | 2.9 | 2.1 | 2.2 | nm | nm = not measurable.

Examples 33–35

The procedures of Examples 27–32 were repeated wherein PDMS 2 was used as the silicone component in place of the bases. The proportions for these examples, and physical test results therefor, are presented in Table 11. It can be seen that for the case of the 70/30 blend of POE/PDMS 2 (Comparative Example 33) the dynamically cured composition actually exhibited a lower tensile and elongation than the simple blend. Thus, such POE compositions containing this or a lesser amount of this silicone gum are outside the scope of the present invention.

In a separate experiment, the POE was mixed with the above described cure agent and catalyst in an experiment similar to that of (Comparative) Example (I) and found to be non-reactive.

TABLE 11

| Type of Blend | Dynamic Cure (Comp.) Example 33 | Simple Blend | Dynamic Cure Example 34 | Simple Blend | Dynamic Cure Example 35 | Simple Blend |
|---|---|---|---|---|---|---|
| Composition | | | | | | |
| PDMS 2 | 30 | 30 | 50 | 50 | 70 | 70 |
| POE | 70 | 70 | 50 | 50 | 30 | 30 |
| X-LINKER 1 | 0.9 | 0 | 1.5 | 0 | 21 | 0 |
| CATALYST 1 | 0.35 | 0 | 0.35 | 0 | 0.53 | 0 |
| Properties | | | | | | |
| Durometer, A | 68 | 65 | 57 | 57 | 52 | nm |
| Tensile (Mpa) | 7.2 | 8.8 | 7.5 | 4.8 | 4.3 | nm |
| Elongation (%) | 1002 | 1445 | 895 | 1134 | 652 | nm |
| 50% Mod. (MPa) | 2.0 | 2.0 | 1.4 | 1.3 | 0.7 | nm | nm = not measurable

Examples 36–47

A series of TPSiVs based on polypropylene resin was prepared, the ingredients and proportions thereof being shown in Table 12. Preparation of Example 43 is illustrative of the procedure followed:

BASE 1 (140 g) was added to a Haake Model 3000 mixing bowl (300 ml) at 160° C. using roller blades at 60 rpm. After 1 minute, PP 2 (60 g) was added. After mixing for about 5 minutes, the temperature had increased from 160 to about 175° C., whereupon 1.14 g of STAB were added. This was mixed for about 2 minutes and 4.8 g of CAS were added. X-LINKER 4 (4.3 g) was added about 3 minutes after the CAS. CATALYST 2 (0.6 g) was added 5 minutes after the cross-linker. The torque quickly rose from about 4,000 m-g to about 11,000 m-g and the temperature rose from 177 to about 210° C. in about 5 minutes during the dynamic cure of the silicone rubber phase. Samples were tested as previously described, the results also being reported in the Table 12.

1 (0.09 g) was added. The torque increased from 350 m-g to 2800 m-g as the silicone phase cured. The material was mixed for 8 minutes after CATALYST 1 addition and the torque reached an equilibrium value of about 2000 m-g at a temperature of about 270° C. Samples were compression molded to give ultimate tensile 16.7 MPa and elongation 222%. The observed variation in tensile and elongation values was considerably reduced relative to a similar system which did not contain STAB and was not purged with nitrogen during mixing.

Example 50

A masterbatch of PE, BASE 3 and X-LINKER 1 was prepared by feeding the PE at a rate of 1.6 kg/hr from a hopper to zone 1 over element GFF2-30-90 of a Leistritz Micro 18 Twin Screw Extruder (American Leistritz Extruder Corp., Somerville, N.J.; screw diameter=18 mm, 40:1=L/D, co-rotating screws; see screw configuration in Table 13 below). The barrel temperature of the extruder was 180° C. for all zones. BASE 3 was fed into the extruder at zone 1

TABLE 12

|  | Ex. 36 | Ex. 37 | Ex. 38 | Ex. 39 | Ex. 40 | Ex. 41 | Ex. 42 | Ex. 43 | Ex. 44 | Ex. 45 | Ex. 46 | Ex. 47 |
| --- | --- | --- | --- | --- | --- | --- | --- | --- | --- | --- | --- | --- |
| Composition |  |  |  |  |  |  |  |  |  |  |  |  |
| PP 2 | 30 | 30 | 30 | 30 | 30 | 30 | 30 | 30 | 30 | 30 | 30 | 30 |
| BASE 1 | 70 | 70 | 70 | 70 | 70 | 70 | 70 | 70 | 70 | 70 | 70 | 70 |
| STAB | 0.55 | 0.57 | 0.57 | 0.56 | 0.57 | 0.58 | 0.56 | 0.57 | 0.57 | 0.56 | 0.58 | 0.55 |
| CAS | 2.4 | 2.4 | 2.4 | 2.4 | 2.4 | 2.4 | 2.4 | 2.4 | 2.4 | 2.4 | 2.4 | 2.4 |
| X-LINKER 1 | 1.04 | 2.22 | 3.2 |  |  |  |  |  |  |  |  |  |
| X-LINKER 3 |  |  |  | 1.03 | 2.12 | 3.15 |  |  |  |  |  |  |
| X-LINKER 4 |  |  |  |  |  |  | 1.02 | 2.15 | 3.14 |  |  |  |
| X-LINKER 2 |  |  |  |  |  |  |  |  |  | 1.16 | 2.20 | 3.18 |
| CATALYST 2 | 0.3 | 0.3 | 0.3 | 0.3 | 0.3 | 0.3 | 0.3 | 0.3 | 0.3 | 0.3 | 0.3 | 0.3 |
| Properties |  |  |  |  |  |  |  |  |  |  |  |  |
| Durometer (A) | 91 | 91 | 92 | 93 | 91 | 91 | 92 | 91 | 94 | 90 | 88 | 90 |
| Tensile (MPa) | 10.2 | 12.0 | 11.0 | 8.5 | 10.0 | 8.7 | 12.7 | 16.0 | 14.4 | 11.5 | 11.4 | 10.5 |
| Elongation (%) | 233 | 323 | 258 | 153 | 204 | 192 | 389 | 508 | 442 | 305 | 267 | 276 |
| 50% Modulus (MPa) | 5.3 | 5.4 | 5.6 | 5.6 | 5.7 | 5.2 | 5.4 | 6.2 | 6.1 | 5.3 | 5.7 | 4.8 |

Example 48

PBT 1 (19.2 g) was added to the mixer at 230° C. After the PBT melted, BASE 1 (28.8 g) was added and mixed for 5 minutes. X-LINKER 1 (1.12 g) was added and mixed for 3 minutes. Then CATALYST 1 (0.09 g) was added and the torque increased from 600 to 1800 m-g and the temperature rose to 250° C. The blend was removed from the mixer 2 minutes after adding CATALYST 1. The resulting TPSiV was molded and tested to obtain a tensile value of 6.2 MPa and elongation of 45%.

The above experiment was repeated wherein the blend was mixed for 19 min at 250° C. after the addition of CATALYST 1. The resulting TPSiV was molded and tested to obtain a tensile value of 12.8 MPa and elongation of 140%.

Example 49

An aluminum block, fitted with a gas inlet and outlet, was fabricated and inserted into the above described mixing bowl to provide a robust nitrogen purge during mixing, as follows. PBT 1 (19.2 g) was added at 225° C. and, after this resin melted, STAB (0.2 g) was added. BASE 1 (28.8 g) was introduced and, after about 3 minutes, X-LINKER 1 (1.0 g) was added and mixed for 3 minutes, whereupon CATALYST over element GFF2-30-90 of the extruder at 4.0 kg/hr and the X-LINKER was added at a rate of 0.036 kg/hr at zone 5, over element GFA2-20-30. The resulting masterbatch was pelletized.

The masterbatch pellets were collected and then fed back into the extruder at 2.9 kg/hr at zone 1 over element GFF2-30-90. Barrel temperatures of all zones were held at 180° C. CATALYST 2, which was pre-diluted to a level of 20% in PDMS 4 was added at the rate of 0.023 kg/hr at zone 5 over element GFA2-20-30. The torque increased from about 5,700 m-g to about 7,500 m-g. The final product was molded and had an average tensile of 8.0 MPa, an average elongation of 246% and Shore A durometer of 88.

TABLE 13

Screw configuration, downstream order from hopper to die:

| Screw Element | Zone |
| --- | --- |
| GFF2-30–90 | 1 |
| GFA2-20–60 | 2 |
| KB4-2-20–90 degree |  |
| GFA2-15–30 |  |
| KB4-2-20–30 degree | 3 |

TABLE 13-continued

Screw configuration, downstream order from hopper to die:

| Screw Element | Zone |
|---|---|
| KB4-2-20–60 degree | |
| Bi-Lobal mixer 20–90 degree | |
| KB4-2-20–30 degree | |
| GFA2-20-30 | 4 |
| KB4-2-20–30 degree | |
| KB4-2-20–60 degree | |
| KB4-2-20–90 degree | |
| KB4-2-20–60L degree, reverse | |
| GFA2-20-30 | 5 |
| KB4-2-20–60 degree | |
| KB4-2-20–60 degree | |
| KB4-2-20–90 degree | |
| ZSS-17.5–15 slotted restrictor | 6 |
| Spacer-5 | |
| GFA2-20–20 | |
| GFA2-20-20 | |
| GFA2-20-90 | 7 |
| GFA2-15-30 | 8 |
| GFA2-15-60 | |

In Table 13, elements indicated by GFA or GFF are conveying type elements and are designated as follows: for example, GFA-2-15-60 wherein G=co-rotating, F=conveying, A=free-meshing, or could be F=freely cut, 2=number of threads, 15=pitch, 60=length of screw element (mm). Elements indicated by KB4 are kneader block type mixing elements and are designated as follows: for example KB4-2-30-30 degree wherein KB=kneading block, 4=number of kneading segments, 2=number of threads, =length of kneading block, 30=twisting angle of the individual kneading segments, no indicator after 30 assumes forward conveying, if L after 30 indicates back-conveying, Bi-Lobal mixer is another type of mixing element having a length of 20 mm. ZSS-17.5-15 is a slotted restrictor having a length of 15 mm, and in the screw design, is followed by a 5 mm spacer.

Example 51

A polyethylene thermoplastic elastomer composition of the present invention was prepared on a co-rotating Werner & Pfleider twin-screw extruder having the following specifications: screw diameter=30 mm; L/D=15:1; maximum torque=222 Nm; screw speed=165 rpm; cooled water bath quench tank; strand pelletizer.

PE2 was fed at a rate of 17.5 g/min. using a gravimetric style "weight loss differential" feeder, BASE 4 was fed at 7.2 g/min. using an electric "screw ram" pump, X-LINKER 1 was fed at a rate of 0.18 g/min. using a dual piston pump and CATALYST 1 was introduced as a dispersion which was diluted seven-fold in a polydimethylsiloxane oil having a viscosity of about 1 Pa-s, this dispersion being fed to the extruder at a rate of 0.037 g/min. also using a dual piston pump. Extruder operating conditions were as follows: hopper zone was water cooled; zones 1 and 2 temp.=180° C.; zone 3 temp.=165° C.; actual melt temperature in zone 3 and extrudate temperature (i.e., after catalyst addition)=195° C.; typical operating torque=40 Nm.

TABLE 14

| | Screw elements | |
|---|---|---|
| Hopper: | SE42/42 | Plastic pellet addition |
| | KB45/5/20 | |
| | KB45/5/14 | |

TABLE 14-continued

| | Screw elements | |
|---|---|---|
| | KB45/5/14R | |
| | SE20/20 | Silicone injection |
| | KB45/5/28 | |
| | KB45/5/20 | |
| | KB45/5/20 | |
| | KB45/5/20 | |
| | KB45/5/14R | |
| | SE20/10 | Crosslinker injection |
| | SME(14 mm, GEAR45) | |
| | KB45/5/20 | |
| | KB45/5/14 | |
| | KB45/5/14R | |
| | TME(14 mm, GEAR-NEUTRAL) | Catalyst injection |
| | TME(14 mm, GEAR-NEUTRAL) | |
| | KB45/5/42 | |
| | KB45/5/28 | |
| | KB45/5/28 | |
| | KB45/5/20 | |
| | KB45/5/20 | |
| | KB45/5/14R | |
| Die: | SE20/20 | |

The resulting extrudate was molded and tested, as previously described, and had a tensile strength of 9.78 MPa and an elongation of 704%.

That which is claimed is:

1. A method for preparing a thermoplastic elastomer, said method comprising:
   (I) first mixing
      (A) a thermoplastic resin selected from the group consisting of a polyolefin and a poly(butylene terephthalate),
      (B) a diorganopolysiloxane having a plasticity of at least 30 and having an average of at least 2 alkenyl radicals in its molecule,
      (C) an organohydrido silicon compound which contains an average of at least 2 silicon-bonded hydrogen groups in its molecule,
      (D) optionally, a reinforcing filler and
      (E) a hydrosilation catalyst,
   components (C) and (E) being present in an amount sufficient to cure said diorganopolysiloxane (B); and
   (II) dynamically curing said diorganopolysiloxane (B), wherein the amount of said diorganopolysiloxane (B) used is such that at least one property of the thermoplastic elastomer selected from tensile strength or elongation is at least 25% greater than the respective property for a corresponding blend wherein said diorganopolysiloxane is not cured and said thermoplastic elastomer has an elongation of at least 25%.

2. The method according to claim 1, wherein said filler (D) is a fumed silica and is present at a level of 5 parts by weight to 150 parts by weight for each 100 parts by weight of said diorganopolysiloxane (B) and said diorganopolysiloxane (B) has a plasticity of 100 to 200.

3. The method according to claim 2, wherein said diorganopolysiloxane (B) is a gum selected from the group consisting of a copolymer consisting essentially of dimethylsiloxane units and methylvinylsiloxane units and a copolymer consisting essentially of dimethylsiloxane units and methylhexenylsiloxane units.

4. The method according to claim 3, wherein said organohydrido silicon component (C) is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon.

5. The method according to claim 4, wherein said catalyst (E) is a neutralized complex of platinous chloride and divinyltetramethyldisiloxane.

6. The method according to claim 2, wherein said thermoplastic resin constitutes 25 to 60 weight percent of the total of components (A) through (E).

7. The method according to claim 6, wherein said thermoplastic resin is selected from the group consisting of polypropylene resins and polyethylene resins.

8. The method according to claim 1, wherein said thermoplastic resin is a poly(butylene terephthalate) resin.

9. The method according to claim 8, wherein said thermoplastic resin constitutes 25 to 60 weight percent of the total of components (A) through (E) and said diorganopolysiloxane (B) has a plasticity of 100 to 200.

10. The method according to claim 9, wherein said filler (D) is a fumed silica and is present at a level of 5 parts by weight to 150 parts by weight for each 100 parts by weight of said diorganopolysiloxane (B) and the mixing and dynamic curing steps are conducted under an inert atmosphere.

11. The method according to claim 10, wherein said diorganopolysiloxane is a gum selected from the group consisting of a copolymer consisting essentially of dimethylsiloxane units and methylvinylsiloxane units and a copolymer consisting essentially of dimethylsiloxane units and methylhexenylsiloxane units.

12. The method according to claim 11, wherein said organohydrido silicon component is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon.

13. The method according to claim 12, wherein said catalyst is a neutralized complex of platinous chloride and divinyltetramethyldisiloxane.

14. The method according to claim 1, wherein said thermoplastic resin is a polypropylene resin and said mixing and vulcanization steps are conducted at a temperature above the melt point of said polypropylene but below 200° C.

15. The method according to claim 1, wherein said thermoplastic resin is a polyethylene resin and said mixing and vulcanization steps are conducted at a temperature above the melt point of said polyethylene to but below 200° C.

16. The method according to claim 1, wherein said thermoplastic resin is a poly(butylene terephthalate) resin and said mixing and vulcanization steps are conducted at a temperature above the melt point of said poly(butylene terephthalate) but below 280° C.

17. The method according to claim 1, wherein the mixing and curing steps are conducted in a twin-screw extruder.

18. The method according to claim 17, wherein said filler is a fumed silica and is present at a level of 5 parts by weight to 150 parts by weight for each 100 parts by weight of said diorganopolysiloxane and said diorganopolysiloxane (B) has a plasticity of 100 to 200.

19. The method according to claim 18, wherein said diorganopolysiloxane is a gum selected from the group consisting of a copolymer consisting essentially of dimethylsiloxane units and methylvinylsiloxane units and a copolymer consisting essentially of dimethylsiloxane units and methylhexenylsiloxane units.

20. The method according to claim 19, wherein said organohydrido silicon component is selected from the group consisting of a polymer consisting essentially of methylhydridosiloxane units and a copolymer consisting essentially of dimethylsiloxane units and methylhydridosiloxane units, having 0.5 to 1.7 weight percent hydrogen bonded to silicon.

21. The method according to claim 20, wherein said catalyst is a neutralized complex of platinous chloride and divinyltetramethyldisiloxane.

22. The method according to claim 18, wherein said thermoplastic resin is polyethylene.

23. A thermoplastic elastomer prepared by the method of claim 1.

24. A thermoplastic elastomer prepared by the method of claim 2.

25. A thermoplastic elastomer prepared by the method of claim 3.

26. A thermoplastic elastomer prepared by the method of claim 4.

27. A thermoplastic elastomer prepared by the method of claim 5.

28. A thermoplastic elastomer prepared by the method of claim 6.

29. A thermoplastic elastomer prepared by the method of claim 7.

30. A thermoplastic elastomer prepared by the method of claim 8.

31. A thermoplastic elastomer prepared by the method of claim 9.

32. A thermoplastic elastomer prepared by the method of claim 10.

33. A thermoplastic elastomer prepared by the method of claim 11.

34. A thermoplastic elastomer prepared by the method of claim 12.

35. A thermoplastic elastomer prepared by the method of claim 13.

36. A thermoplastic elastomer prepared by the method of claim 14.

37. A thermoplastic elastomer prepared by the method of claim 15.

38. A thermoplastic elastomer prepared by the method of claim 16.

39. A thermoplastic elastomer prepared by the method of claim 17.

40. A thermoplastic elastomer prepared by the method of claim 18.

41. A thermoplastic elastomer prepared by the method of claim 19.

42. A thermoplastic elastomer prepared by the method of claim 20.

43. A thermoplastic elastomer prepared by the method of claim 21.

44. A thermoplastic elastomer prepared by the method of claim 22.

* * * * *